(12) United States Patent
Lai et al.

(10) Patent No.: US 10,634,947 B2
(45) Date of Patent: Apr. 28, 2020

(54) EDGE BACKLIGHT MODULE WITH STACKED LIGHT GUIDE PLATES, DISPLAY APPARATUS AND BACKLIGHT CONTROL METHOD THEREOF

(71) Applicant: Acer Incorporated, New Taipei (TW)

(72) Inventors: Yi-Chang Lai, New Taipei (TW);
Chih-Chiang Chen, New Taipei (TW);
Hsu-Hsiang Tseng, New Taipei (TW);
Ruey-Ching Shyu, New Taipei (TW)

(73) Assignee: Acer Incorporated, New Taipei (TW)

( * ) Notice: Subject to any disclaimer, the term of this patent is extended or adjusted under 35 U.S.C. 154(b) by 245 days.

(21) Appl. No.: 15/802,439

(22) Filed: Nov. 2, 2017

(65) Prior Publication Data

US 2019/0064588 A1 Feb. 28, 2019

(30) Foreign Application Priority Data

Aug. 30, 2017 (TW) .................. 106129472

(51) Int. Cl.
*G02F 1/1335* (2006.01)
*G02F 1/13357* (2006.01)
(Continued)

(52) U.S. Cl.
CPC ....... *G02F 1/133602* (2013.01); *G02B 6/009* (2013.01); *G02B 6/0053* (2013.01);
(Continued)

(58) Field of Classification Search
CPC ......... G02F 1/133602; G02F 1/133553; G02F 1/133615; G02B 6/0076; G02B 6/0053;
(Continued)

(56) References Cited

U.S. PATENT DOCUMENTS 8,593,587 B2 11/2013 Ren et al.
2012/0105508 A1 5/2012 Masuda
(Continued)

FOREIGN PATENT DOCUMENTS

CN 101414079 4/2009
JP 2009170325 7/2009
(Continued)

*Primary Examiner* — Anh T Mai
*Assistant Examiner* — Hana S Featherly
(74) *Attorney, Agent, or Firm* — JCIPRNET

(57) ABSTRACT

An edge backlight module, a display apparatus and a backlight controlling method thereof are provided. Each light guide plate (LGP) is divided into longitudinal region(s) in the same direction. The LGPs are arranged in a stacked manner. Each two adjacent LGPs are arranged as upper LGP being completely overlapped with the longitudinal region(s) of lower LGP. The longitudinal region overlapped with adjacent upper LGP is defined as a reflecting region. The longitudinal region not overlapped with adjacent upper LGP is defined as an emitting region. Each LGP has one emitting region. Each reflecting film is sandwiched between two adjacent LGPs. Light from a light emitting device is emitted from the emitting region. Combing with lighting control at lateral region(s) separately, an array region is formed. The light emitting device further includes a high saturation light emitter to render an effect with a high dynamic range and high saturation.

9 Claims, 9 Drawing Sheets

(51) Int. Cl.
*H05B 33/08* (2020.01)
*F21V 8/00* (2006.01)
*G09G 3/34* (2006.01)

(52) U.S. Cl.
CPC ......... *G02B 6/0055* (2013.01); *G02B 6/0076* (2013.01); *G02B 6/0088* (2013.01); *G02F 1/133553* (2013.01); *G02F 1/133615* (2013.01); *H05B 33/0842* (2013.01); *G09G 3/3413* (2013.01)

(58) Field of Classification Search
CPC .... G02B 6/0055; G02B 6/0088; G02B 6/009; H05B 33/0842; G09G 3/3413
USPC .......................................................... 362/616
See application file for complete search history.

(56) References Cited

U.S. PATENT DOCUMENTS

| | | | |
|---|---|---|---|
| 2012/0113155 A1 | 5/2012 | Fang et al. | |
| 2012/0162281 A1* | 6/2012 | Cho | G02B 6/0036 |
| | | | 345/690 |

FOREIGN PATENT DOCUMENTS

| | | |
|---|---|---|
| TW | M407407 | 7/2011 |
| TW | I394128 | 4/2013 |
| TW | 201525977 | 7/2015 |
| TW | I553377 | 10/2016 |
| TW | I556215 | 11/2016 |
| TW | I570478 | 2/2017 |

* cited by examiner

FIG. 9

EDGE BACKLIGHT MODULE WITH STACKED LIGHT GUIDE PLATES, DISPLAY APPARATUS AND BACKLIGHT CONTROL METHOD THEREOF

CROSS-REFERENCE TO RELATED APPLICATION

This application claims the priority benefit of Taiwan application serial no. 106129472, filed on Aug. 30, 2017. The entirety of the above-mentioned patent application is hereby incorporated by reference herein and made a part of this specification.

BACKGROUND OF THE DISCLOSURE

1. Field of the Disclosure

The disclosure relates to a display technology, and particularly relates to an edge backlight module, a display apparatus, and a backlight control method thereof.

2. Description of Related Art

In order to facilitate viewers' visual sensation, efforts have been made proactively in hope that display apparatuses are able to render images closer to reality. The technology of high dynamic range (HDR) is one of the technologies that renders more vivid images with a greater range of contrast, a greater color depth, and a greater color space. Currently, organic light emitting diodes (OLEDs) are commonly used in the industry to implement HDR. However, due to a lower yield rate, a greater amount of heat, and a higher cost, some also adopt the solution of liquid crystal display module (LCM) to lower the cost and overcome the limitation on yield rate while similarly achieve a high contrast and a high color saturation.

Currently, to achieve a high contrast by adopting the LCM, relevant algorithms and a direct backlight module must be used together. However, the overall thickness of the LCM is greater under the condition, and the number of light emitting diode (LED) arrays is also key to affect the contrast between different regions. In order to carry the LED arrays, a full backplate design is commonly adopted for the LCM. However, the overall weight of the LCM is increased. As a result, the direct backlight module is less suitable for a laptop computer with a miniaturized design.

Some others thus adopt an edge backlight module to reduce the thickness. In order to render a frame with high saturation, a quantum dot film or a quantum dot lamp tube may be disposed in the edge backlight module, and a blue light LED serves to excite the quantum dot to render a high saturation effect (e.g., Adobe 100%). However, the film is expensive and may generate a non-active region in a high temperature and high humidity environment. In addition, a blue light leaking region may be formed in an active region of the LCM. While it is possible to increase the size of an LCM board to avoid formation of the blue light leaking region, a narrow board design thus becomes unachievable with such configuration.

SUMMARY OF THE DISCLOSURE

The disclosure provides an edge backlight module, a display apparatus, and a backlight control method, where an array region is formed by adopting a light guide plate (LGP) stack structure and region-based light emission control, thereby rendering an effect with a high dynamic range and high saturation.

An edge backlight module according to an embodiment of the disclosure includes a plurality of light guide plates (LGPs), at least one reflecting film, and a plurality of light emitting devices. Each of the LGPs is divided into longitudinal regions extending in the same direction. The LGPs are arranged in a stacked manner, where each two adjacent LGPs of the LGPs in upper and lower position are arranged as a bottom of LGP located at upper position being completely overlapped with at least one longitudinal region of LGP located at lower position. The longitudinal region of each of the LGPs overlapped with adjacent LGP located at upper position thereof is defined as a reflecting region. The longitudinal region of each of the LGPs not overlapped with the adjacent LGP located at upper position is defined as an emitting region, and each of the LGPs has one emitting region. The reflecting film is sandwiched between the reflecting regions of each two adjacent LGPs. The light emitting devices are respectively disposed at a side of the respective LGPs. Each of the light emitting devices emits light toward the corresponding LGPs, and the light is reflected at the reflecting regions of the corresponding LGPs and emitted from the emitting regions of the corresponding LGPs.

The display apparatus according to an embodiment of the disclosure includes the edge backlight module and a liquid crystal panel. The liquid crystal display panel is disposed above the edge backlight module.

A backlight control method according to an embodiment of the disclosure is adapted to a display apparatus. The backlight control method includes the following. The aforementioned edge backlight module is provided. The LGPs are divided into sub-regions as an M×N array, wherein M and N are positive integers greater than 1. In addition, each of the light emitting devices includes a white light emitter and a high saturation light emitter. A frame to be displayed by the display apparatus is divided into sub-frames as the M×N array, and the sub-frames respectively correspond to the sub-regions. The white light emitter and the high saturation light emitter corresponding to each of the sub-regions are controlled to be turned on and off based on contents of the sub-frames.

Based on the above, the LGPs are stacked to form the emitting regions not overlapped with each other at the respective layers. Combing with region-based control (lateral regions) on the light emitting devices, the sub-regions arranged in the array are formed to separately dim the light of a specific sub-region. Besides, the contents of the frame are analyzed to control the white light emitters and the high saturations in the respective sub-regions. Accordingly, a high dynamic contrast and a high color saturation are achieved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9 is a schematic view illustrating brightness control of a 5×5 array.

DESCRIPTION OF THE EMBODIMENTS

Figure 1A:
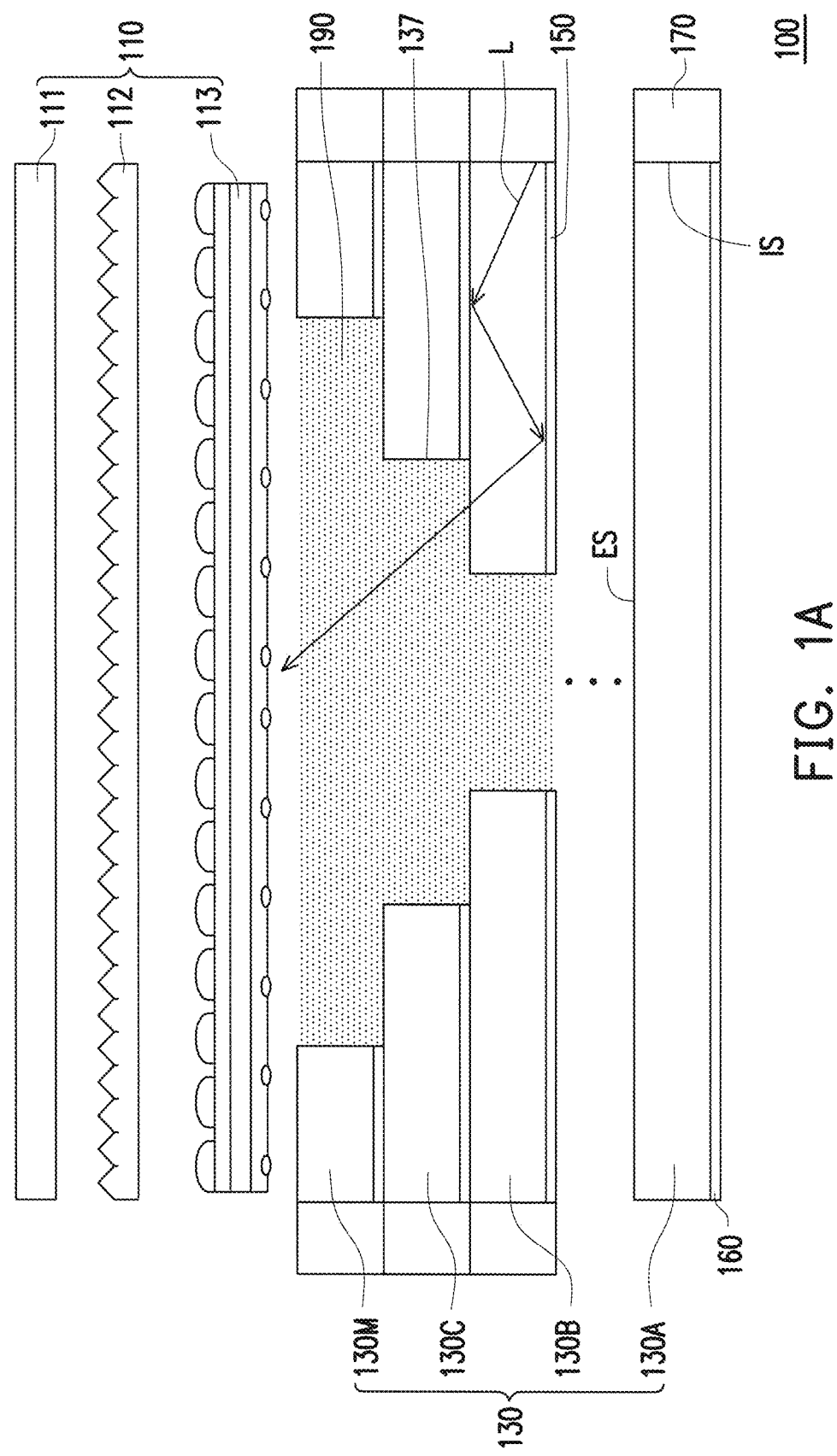
FIGS. 1A and 1B are schematic views illustrating an edge backlight module according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
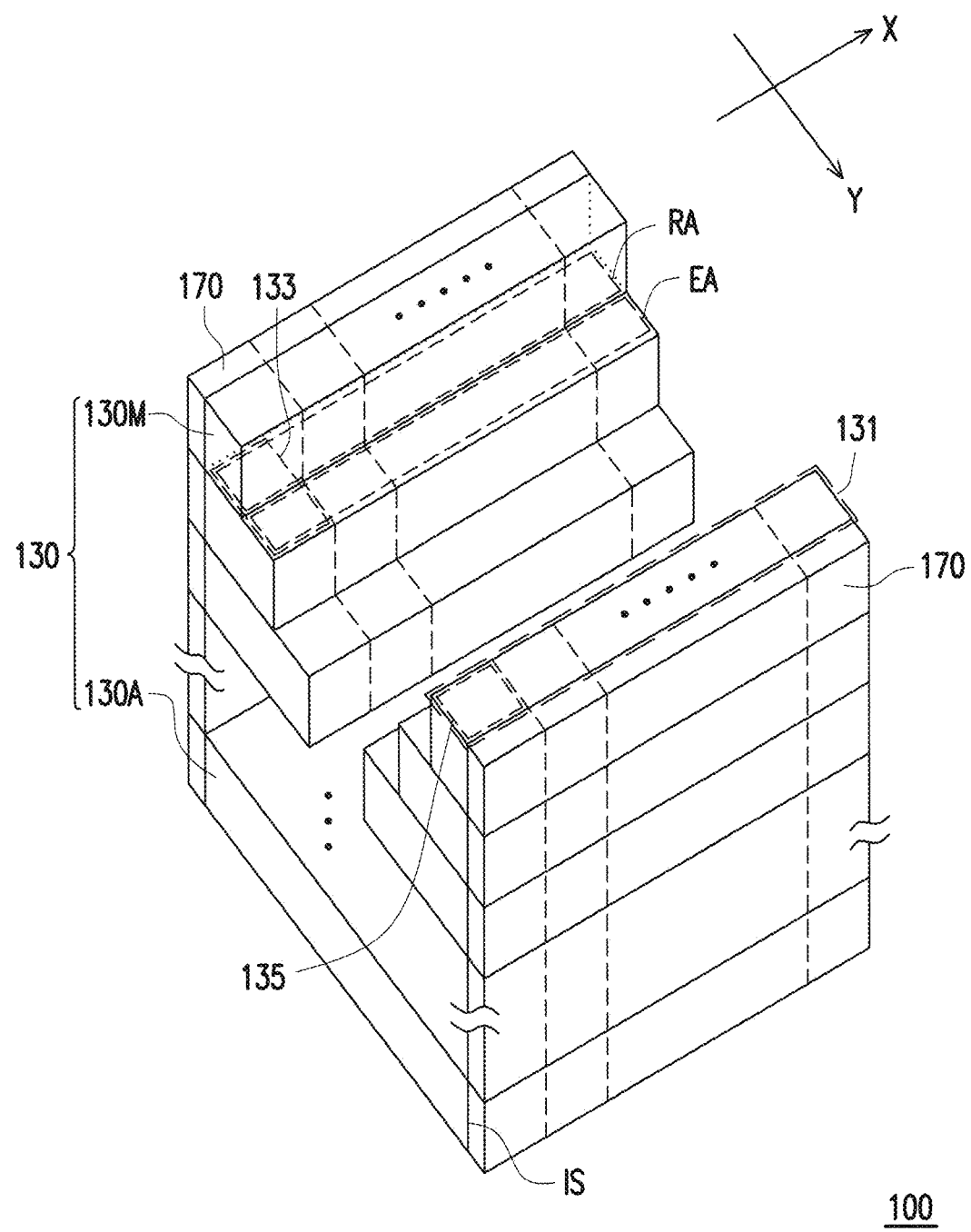

FIGS. 1A and 1B are schematic views illustrating an edge backlight module 100 according to a first embodiment of the disclosure. Referring to FIG. 1A, the edge backlight module 100 at least includes, but is not limited to, an optical film set 110, M light guide plates (LGPs) 130, a reflecting film 150, a single-sided reflecting film 160, a light emitting device 170, and a light guide structure 190. M is a positive integer greater than 1.

In the present embodiment, the optical film set 110 includes a dual brightness enhancement film (DBEF) 111, a prism film 112 and a diffuser 113. However, in other embodiments, the optical film set 110 may be arranged differently and have other films.

Referring to FIGS. 1A and 1B, each of the LGPs 130 may be divided into one or more longitudinal regions 131 extending in the same direction (defined to be X direction parallel to an incident surface IS). For example, a lowermost LGP 130A has M longitudinal regions 131, whereas an uppermost LGP 130M has one longitudinal region 131. Assuming that top areas of the respective longitudinal regions 131 have the same size, a total width of the LGP 130A is defined as one unit, and a width of each of the longitudinal regions 131 is 1/M unit. Each LGP 130 may be further divided into N lateral regions 133 extending in a direction (defined to be Y direction perpendicular to the incident surface IS) perpendicular to the longitudinal regions 131. N is a positive integer. Assuming that top areas of the respective lateral regions 133 have the same size, the longitudinal regions 131 and the lateral regions 133 are intersected to form sub-regions 135 in an M×N array. In addition, the respective sub-regions 135 are equal in size.

It should be noted that while the respective sub-regions 135 in the present embodiment are equal in size, the top areas of the longitudinal regions 131 may be different and/or the lateral regions 133 may be different in other embodiments, so the sub-regions 135 may not be equal in size. People having ordinary skills in the art may properly adjust the sub-regions 135 based on the needs.

The light guides 130 are arranged in a stacked manner, and the incident surfaces ISs of the LGPs 130 are aligned with each other, while emitting surfaces ESs all face toward the top of the drawing. Each two adjacent LGP 130 located at upper and lower positions are arranged as the bottom of each upper LGP 130 being completely overlapped with one or more longitudinal regions 131 of its adjacent lower LGP 130 located at lower position. For example, LGP 130C has two longitudinal regions 131. Therefore, the bottom of the LGP 130C is completely overlapped with two longitudinal regions 131 in LGP 130B. In addition, each of the LGPs 130 has only one longitudinal region 131 that is not overlapped. The rest of the LGPs 130 are arranged based on the same principle. Therefore, the LGPs 130 are in a stepped shape of an inverted triangle. In the present embodiment of the disclosure, the longitudinal region 131 of each of the LGPs 130 overlapped with the adjacent LGP 130 located at its upper position is defined as a reflecting region RA, and the longitudinal region 131 of each of the LGPs 130 not overlapped with the adjacent LGP 130 located at its upper position is defined as an emitting region EA. In addition, each of the LGPs 130 has only one emitting region EA.

To prevent the stacked structure from being overly thick, the incident surfaces ISs of the LGPs 130 may be aligned to two side edges based on needs. In other words, I layers of the LGPs 130 may be stacked at one side, and J layers of the LGPs 130 may be stacked at the other side. In addition, I and J are positive integers and satisfy I+J−1=M.

Figure 2A:
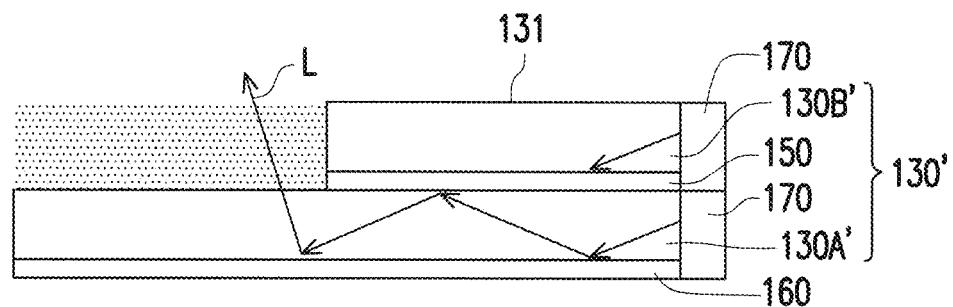
FIG. 2A is a view illustrating an example of stacking in an 2×N array.

For example, FIG. 2A is a view illustrating an example of stacking in a 2×N (i.e., M=2) array. Referring to FIG. 2A, a LGP 130B' has one longitudinal region 131, whereas the LGP 130N has two longitudinal regions 131. In other words, a size of the LGP 130B' is half of a size of the LGP 130A'. The two LGPs 130' form one layer at the left side of the drawing, and form two layers at the right side of the drawing.

Figure 2B:
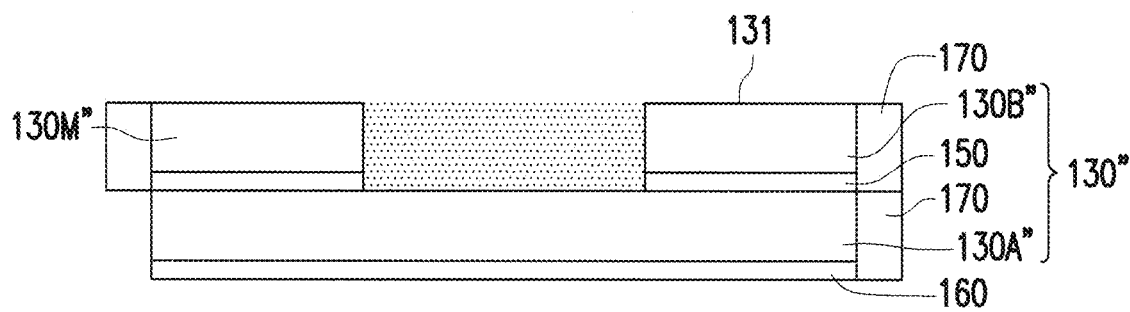
FIG. 2B is a view illustrating another example of stacking in an 3×N array.

FIG. 2B is a view illustrating another example of stacking in a 3×N (i.e., M=3) array. Referring to FIG. 2B, a LGP 130B" and a LGP 130M" each has one longitudinal region 131, whereas the LGP 130K has two longitudinal regions 131. In other words, a size of each of the LGP 130W and the LGP 130M" is one-third of a size of the LGP 130K. These LGPs 130" form two layers at the left side of the drawing, and form two layers at the right side of the drawing.

It should be noted that, in other embodiments, the incident surfaces ISs of the LGPs 130 in FIG. 1A may also be merely aligned to one edge. In other words, the M LGPs 130 form M layers, however the thickness should be taken into consideration.

Referring to FIG. 1A, each reflecting film 150 may be a double-sided reflecting film or a combination of two single-sided reflecting films whose reflecting surfaces facing toward opposite directions. Each reflecting film 150 is sandwiched between the reflecting regions RAs of each two adjacent LGPs 130, where each reflecting film 150 has the same size as the bottom area of its adjacent upper LGP 130. The edge backlight module 100 additionally includes the single-sided reflecting film 160 disposed on the bottom of the lowermost LGP 130A, where the single-sided reflecting film 160 has the same size as the bottom area of the lowermost LGP 130A. Besides, a reflective coating film 137 is disposed on each LGP 130 at a side opposite to the incident surface IS located at the same LGP 130.

The light emitting device 170 may be a light emitting diode (LED) light bar or a light source of a different type.

Figure 3:
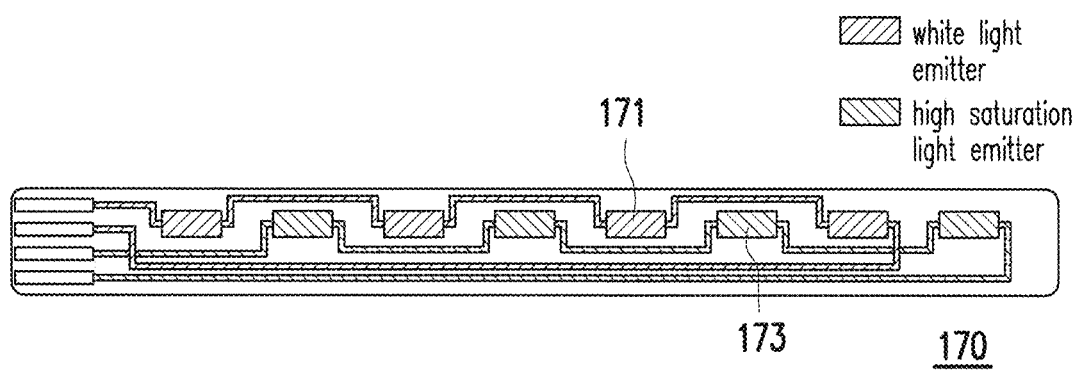
FIG. 3 is a view illustrating an example of a light emitting device.

The light emitting device 170 is disposed at a side of each of the LGPs 130 (i.e., the side facing toward the incident surface IS). In the embodiment, N light emitting devices 170 are sequentially arranged at a side of the respective LGPs 130. In addition, each of the N light emitting devices 170 corresponds to one of the lateral regions 133. FIG. 3 is a view illustrating an example of the light emitting device 170. Referring to FIG. 3, the light emitting device 170 has two strings of white light emitters 171 and high saturation light emitters 173. The white light emitter 171 is a white light emitting diode (LED) or other light emitters that emit white light, and the high saturation light emitter is a KSF LED (which has a superior red and green light emitting performance over that of the white LED) and a combination of red, blue, and green LEDs or other light emitters having a high saturation phosphor. Referring to FIG. 1A, each light emitting device 170 emits light L (white light and/or high saturation light) toward the incident surface IS of the corresponding LGP 130. In addition, the light L is reflected at reflecting regions RAs of two corresponding LGPs 130 located at upper and lower positions and emitted from the emitting region EA of LGP 130 located at lower position. With the sandwiched reflecting film 150 that is reflective on two sides, the light from an upper layer does not leak to the lower layer but is guided by the reflecting film 150 to the same LGP 130. Following the same principle, the light from the lower layer does not leak to the upper layer, either. Accordingly, the light from any of the light emitting devices 170 is emitted from the specific sub-regions 135 in the M×N array.

It should be noted that, in other embodiments, the number of the light emitting devices 170 disposed at a side of any of the LGP 130 may not be N, as long as the arrangement of the N lateral regions 133 can be controlled separately. Besides, in other embodiments, the light emitting device 170 in FIG. 3 only requires at least one white light emitter 171 and at least one high saturation light emitter 173.

The light guide structure 190 may be an optical structure including a material the same as or similar to that of the LGP 130. In addition, the light guide structure 190 is disposed at an accommodating space formed by the stacked LGPs 130. Disposing the light guide structure 190 makes it easier to make alignment during assembling, support the optical film set 110 located at an upper layer, reinforce uniformity of light on the edge, and maintain structural strength.

Figure 4A:
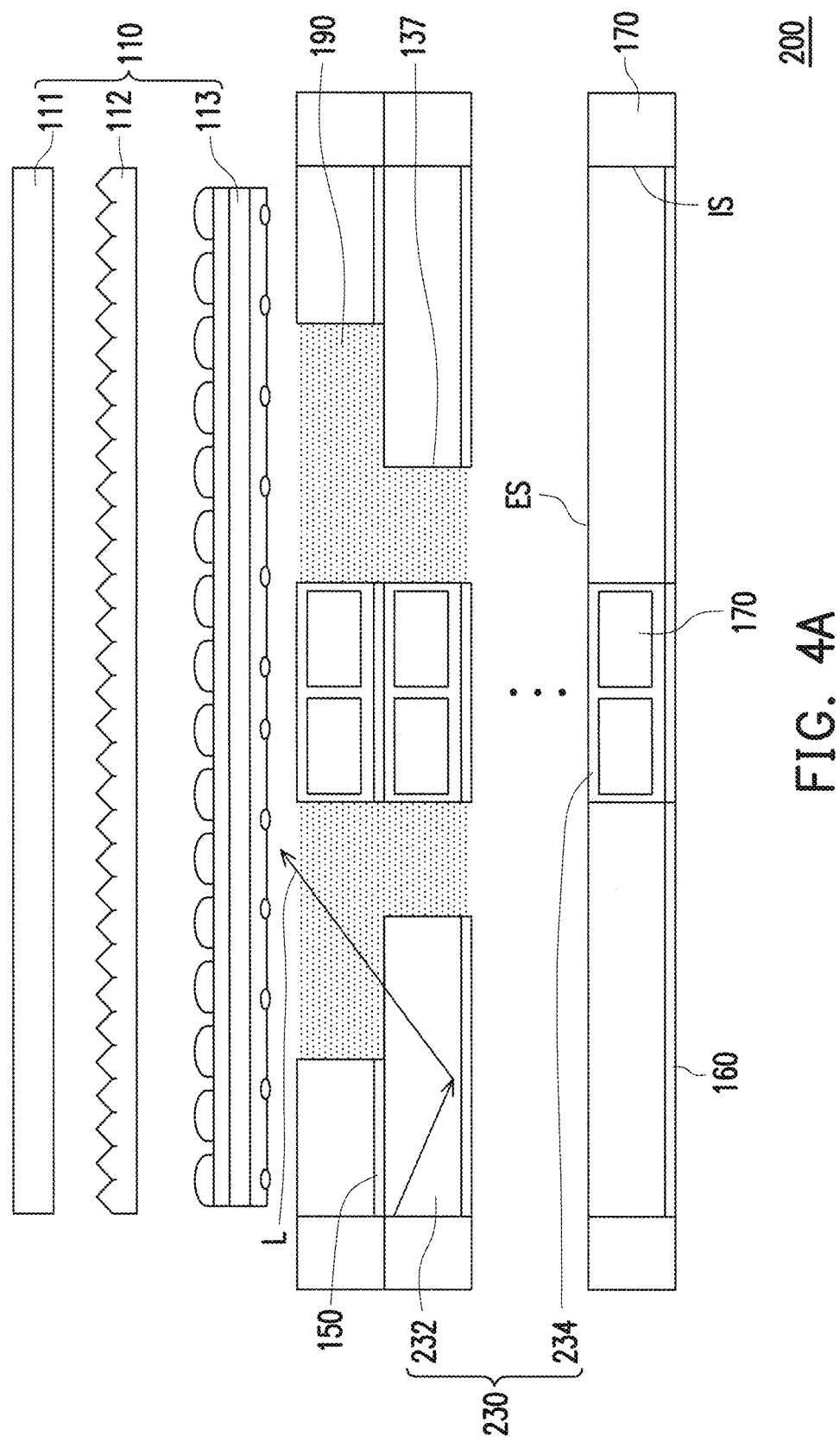
FIGS. 4A to 4C are schematic views illustrating an edge backlight module according to a second embodiment of the disclosure.
Figure 4B:
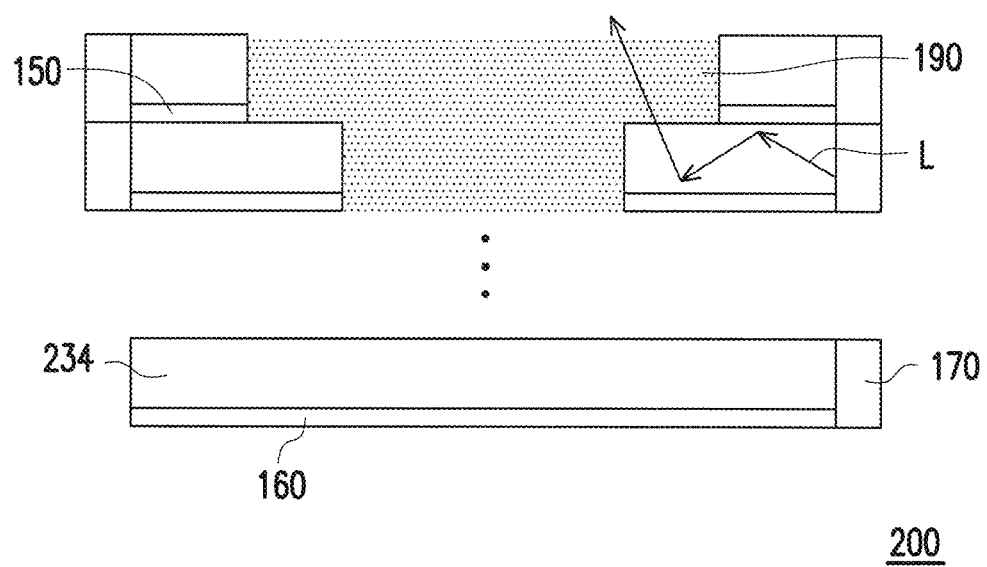
Figure 4C:
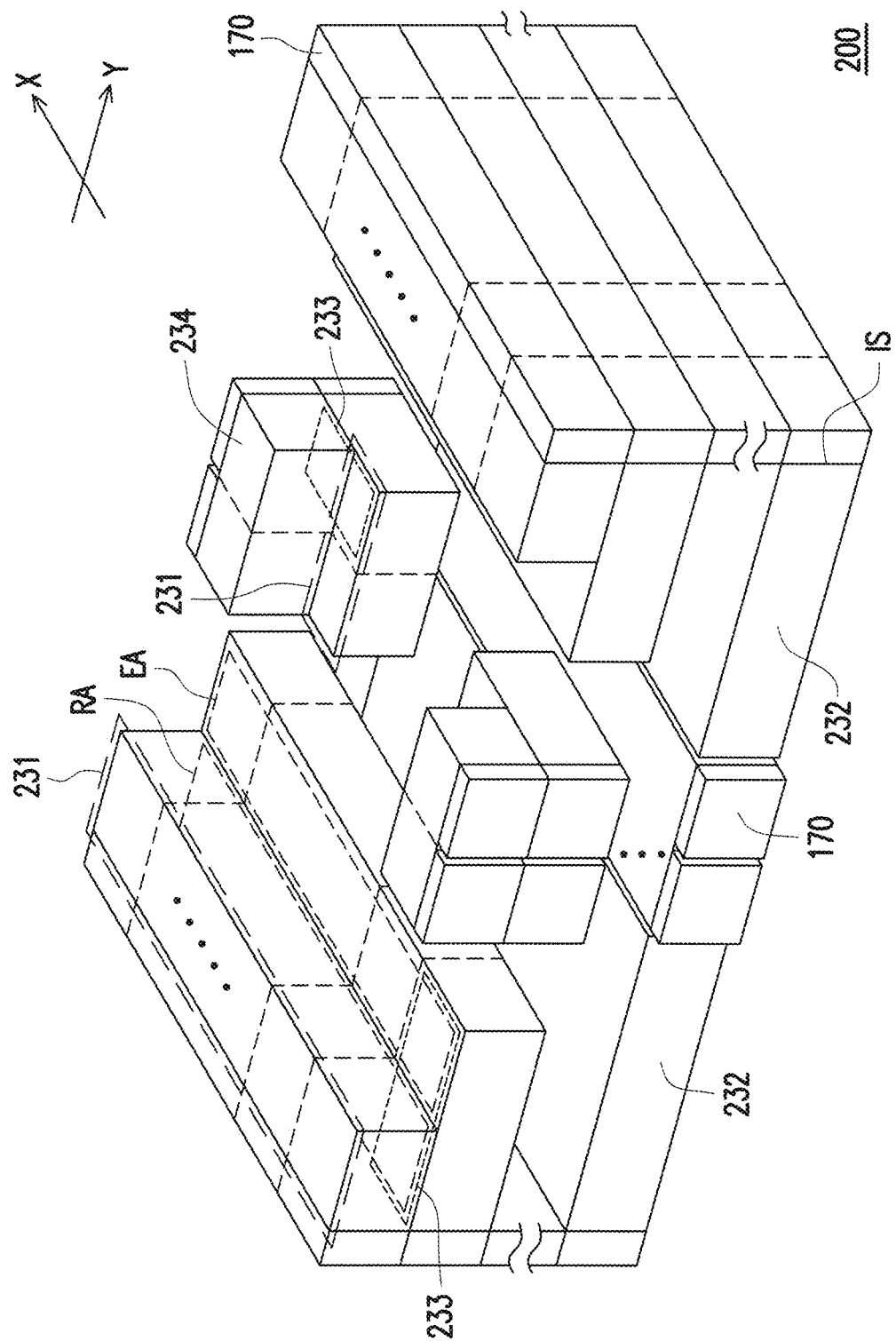

FIGS. 4A to 4C are schematic views illustrating an edge backlight module 200 according to a second embodiment of the disclosure. Referring to FIG. 4A, an edge backlight module 200 at least includes, but is not limited to, the optical film set 110, M' LGPs 230, the reflecting layer 150, the single-sided reflecting film 160, the light emitting device 170, and the light guide structure 190. Descriptions of components, regions, and objects in the edge backlight module 200 referred to by symbols or names same as those in the edge backlight module 100 of the first embodiment can be referred to the descriptions about FIGS. 1 to 3, and thus will not be repeated in the following. M' is a positive integer greater than 3.

What differs from the first embodiment is that, in order to reduce the overall thickness, the LGPs 230 include K longitudinal LGPs 232 and L lateral LGPs 234. Referring to FIG. 4A, the K longitudinal LGPs 232 are stacked to form O layers at the left side of the drawings and P layers at the right side of the drawing. K, O, and P are positive integers greater than 1 and satisfy O+P=K. The longitudinal LGPs 232 located at the two sides are disposed symmetrically, and the two lowermost longitudinal LGPs 232 are not connected to each other. Referring to FIGS. 4A to 4C, the L lateral LGPs 234 are located between the O layers of the longitudinal LGPs 232 and the P layers of the longitudinal LGPs 232. In addition, the L lateral LGPs 234 are stacked to form Q layers at the left side of FIG. 4 and R layers at the right side of FIG. 4B. L, Q, and R are positive integers greater than 1 and satisfy Q+R−1=L. In addition, longitudinal regions 231 of the lateral LGPs 234 extend along Y direction, while lateral regions 233 of the lateral LGPs 234 extend along X direction. Therefore, as the number of the lateral regions 233 of the lateral LGPs 233 increase, a height of stacking is able to be reduced while comparing with the same array of the first embodiment.

Figure 5:
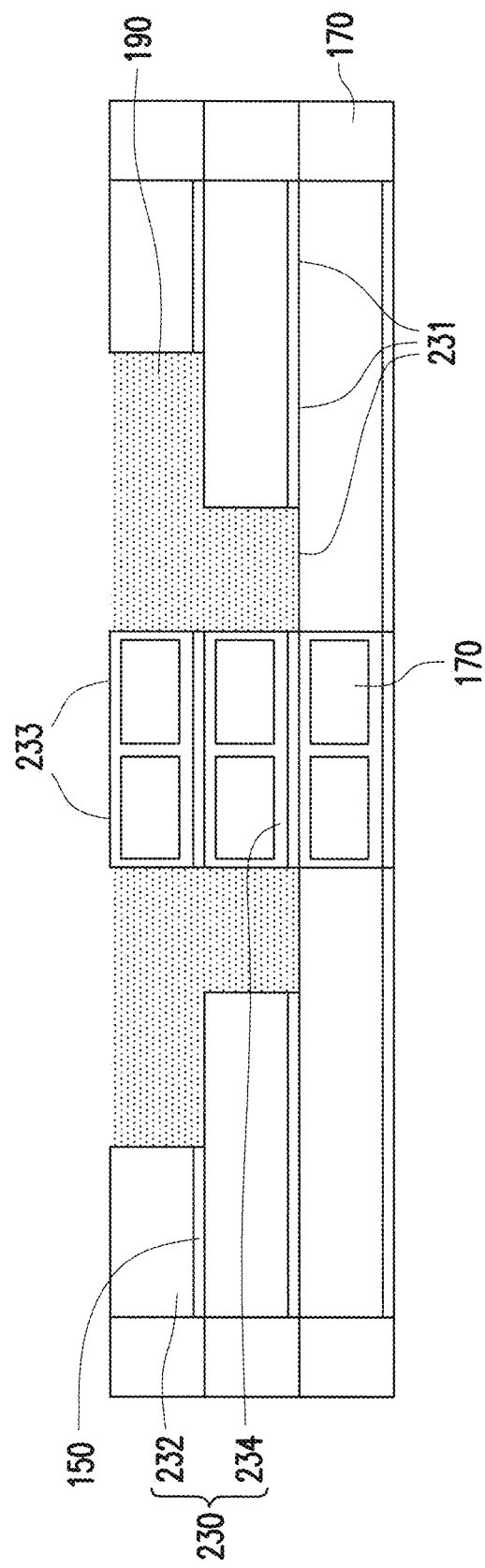
FIG. 5 is a view illustrating an example of stacking in an 8×N array.

For example, FIG. 5 is a view illustrating an example of stacking in an 8×N array. Referring to FIG. 5, each of the two lowermost LGPs 232 has three longitudinal regions 231, and the lateral LGP 234 has two lateral regions 233. Compared with the first embodiment, which requires five layers to form the 8×N array, only three layers are required in the second embodiment.

Figure 6:
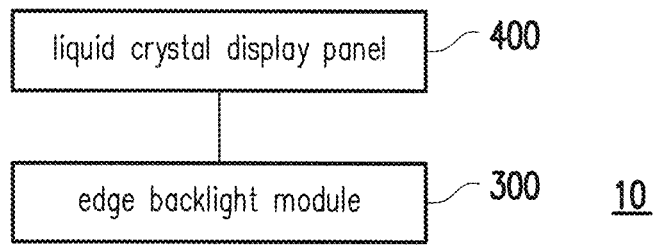
FIG. 6 is a schematic block view illustrating a display apparatus according to an embodiment of the disclosure.

FIG. 6 is a schematic block view illustrating a display apparatus 10 according to an embodiment of the disclosure. Referring to FIG. 6, the display apparatus 10 has an edge backlight module 300 and a liquid crystal display panel 400. The edge backlight module 300 may be equivalent to the edge backlight module 100 of the first embodiment or the edge backlight module 200 of the second embodiment. The liquid crystal display panel 400 (a thin film transistor liquid crystal display panel or other types of panels) is disposed above the edge backlight module 300. An area of the liquid crystal display panel 400 is substantially equivalent to an area of the edge backlight module 300.

In order to drive the edge backlight module 300, a backlight driving unit, such as a chip, a microprocessor, a specialized controller in hardware structure or a software module, needs to be capable of controlling the light emitting devices 170 to light all of the sub-regions 135 in the M×N array respectively. In addition, one or more backlight driving units are required to exert region-based control. Moreover, a driving algorithm of the edge backlight module 300 may be implemented in a timing controller (TCON) of the display apparatus 10, so that the TCON may control the backlight driving unit. Alternatively, the driving algorithm may be directly implemented at a system end. Whether the algorithm with a backlight control method is implemented in the system or in the TCON, an initialization process is required to set the M×N array and confirm whether the high saturation light emitter 173 is available.

Figure 7:
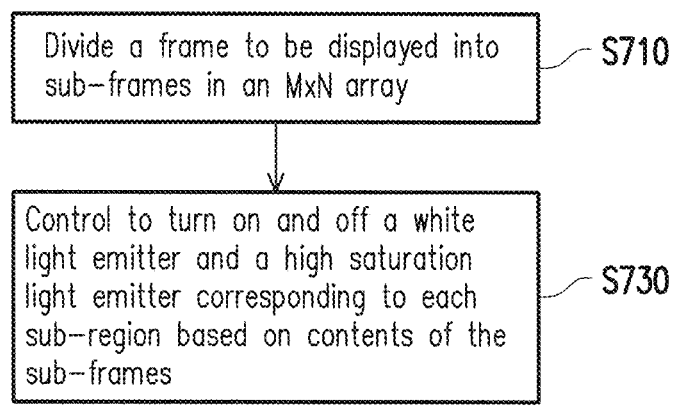
FIG. 7 is a flowchart illustrating a backlight control method of a display apparatus according to an embodiment of the disclosure.

FIG. 7 is a flowchart illustrating a backlight control method of a display apparatus 10 according to an embodiment of the disclosure. Referring to FIG. 7, the respective steps of the method are adjustable based on practical needs, and shall not be considered as being limited herein. In the following, the backlight control method may be operated by the TCON or at the system end.

At Step S710, a frame to be displayed by the liquid crystal display panel 400 is divided into sub-frames in a M×N array. In addition, the sub-frames respectively correspond to the sub-regions 135 located directly at its lower position. In other words, positions of the sub-regions 135 respectively correspond to specific blocks of the liquid crystal display panel 400. By emitting the light L from one of the sub-regions 135, an image is rendered at the corresponding block on the liquid crystal display panel 400.

After obtaining a maximum grayscale value (brightest) and a minimum grayscale value (darkest), an averaged grayscale value, and a color saturation of the frame, at Step S730, the white light emitters 171 and the high saturation light emitters 173 corresponding to the respective sub-regions 135 are respectively controlled to be turned on and off based on contents of the sub-frames.

For example, if an averaged grayscale value of one sub-frame falls within plus or minus 10 percent of the averaged grayscale value of the whole frame, the white light emitter 171 of the corresponding sub-region 135 is turned on. If an averaged grayscale value of one sub-frame falls within plus or minus 5 percent of the maximum grayscale value of the whole frame, the white light emitter 171 of the corresponding sub-region 135 is turned on and a brightness is increased. If an averaged grayscale value of one sub-frame falls within plus or minus 8 percent of the minimum grayscale value of the whole frame, the white light emitter 171 of the corresponding sub-region 135 is turned off.

When used with the high saturation light emitter 173, the high saturation light emitter of the corresponding sub-region 135 may be controlled to be turned on based on the color saturation of one of the sub-frames. In addition, based on the brightness (e.g., a high brightness and a high contrast are required) of one of the sub-frames, the high saturation light emitter 173 and the white light emitter 171 of the corresponding sub-region 135 may be controlled to be turned on together.

Figure 8:
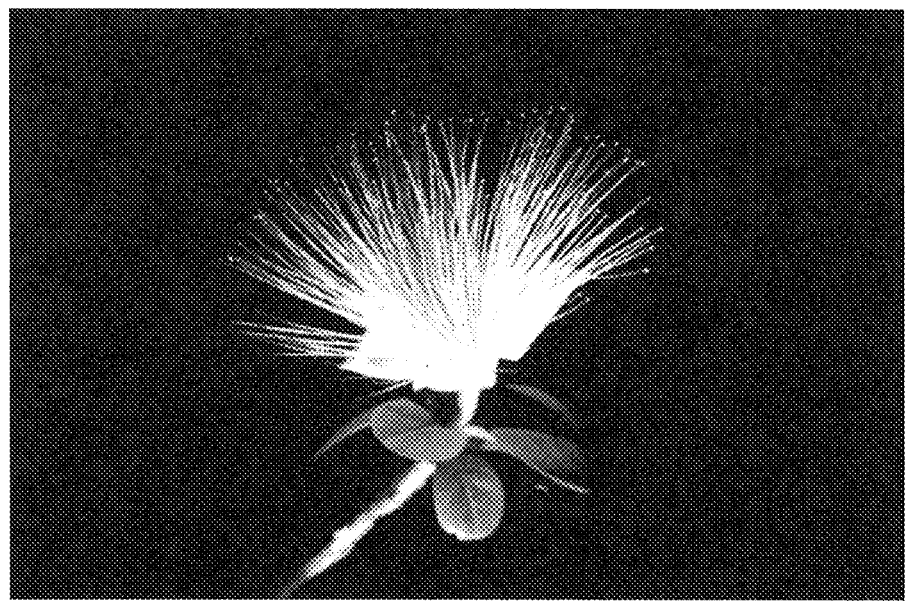
FIG. 8 is a view illustrating an example of a frame.
Figure 9:
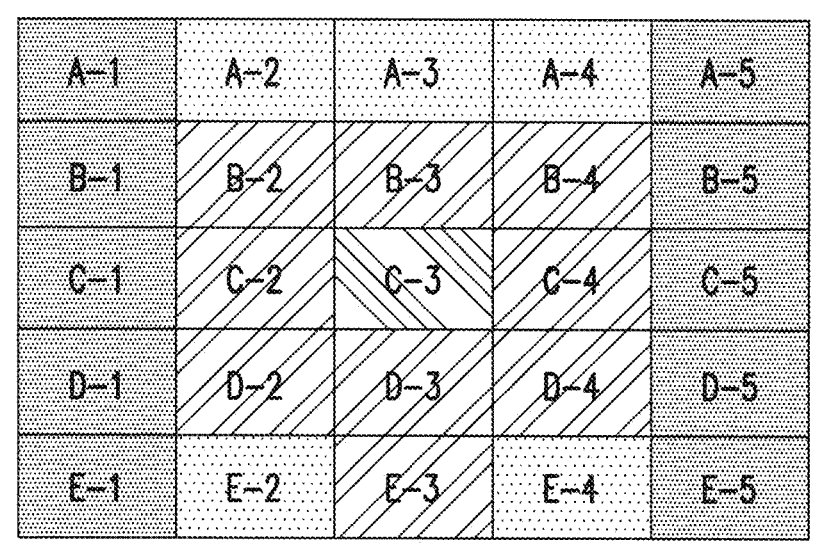

FIG. 8 is a view illustrating an example of a frame, and FIG. 9 is a schematic view illustrating brightness control of an 5×5 array. Referring to FIGS. 8 and 9, a sub-region C-3 corresponding to the LGP 130 or 230 at the center requires a high brightness to highlight the brightness of the flower, so the high saturation light emitter 173 and the white light emitter 171 are turned on together. Sub-frames corresponding to sub-regions B-2 to B4, C-2, C-4, D-2 to D-4, and E3 require a high color saturation, so the corresponding high saturation light emitters 173 are turned on. Sub-frames corresponding to sub-regions A-2 to A-4, E-2, and E-4 do not require a high color saturation, so only the corresponding white light emitters 171 are turned on. Sub-frames corresponding to sub-regions A-1, B-1, C-1, D-1, E-1, A-5, B-5, C-5, D-5, and E-5 are black, so the corresponding high saturation light emitters 173 and the white light emitters 171 are turned off together. These sub-regions show a high contrast with respect to the sub-regions whose light emitters are all turned on. In addition, by turning off all the light emitters, a completely black screen is rendered. Therefore, light leakage of an in-plane-switching (IPS) liquid crystal display panel found in a dark room due to deformation of the module and squeezing by an external force may be avoided.

It should be noted that parameters of the algorithm for controlling the high saturation light emitters 173 and the white light emitters 171 described in the foregoing merely serve as an example, and those adopting the embodiment of the disclosure may make adjustment based on practical needs.

In view of the foregoing, in the edge backlight module, the display apparatus, and the backlight control method thereof according to the embodiments of the disclosure, the LGPs in different sizes are stacked in a specific arrangement (thereby forming the longitudinal regions), and region-based control is exerted on the light emitting devices at a side of the respective LGPs (thereby forming the lateral regions). As a consequence, the sub-regions in the M×N array are formed. In addition, the high saturation light emitters are disposed in the light emitting devices. By controlling the brightness of the white light emitters and the high saturation light emitters based on image content of the frame and controlling the backlight with region-based control, the display apparatus is able to render a frame with a high dynamic contrast and a high color saturation. Thus, the viewing sensation of the viewer is facilitated.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An edge light backlight module, comprising:
a plurality of light guide plates (LGPs), wherein each of the LGPs is divided into at least one longitudinal region extending in the same direction, the LGPs are arranged in a stacked manner, and each two adjacent LGPs of the LGPs in upper and lower positions are arranged as a bottom of LGP located at upper position being completely overlapped with at least one longitudinal region of LGP located at lower position, one of the longitudinal region of each of the LGPs overlapped with adjacent LGP located at upper position thereof is defined as a reflecting region, one of the longitudinal region of each of the LGPs not overlapped with the adjacent LGP located at upper position thereof is defined as an emitting region, and each of the LGPs has one of the emitting region;
at least one reflecting film, sandwiched between the reflecting regions of each two adjacent LGPs of the LGPs; and
a plurality of light emitting devices, respectively disposed at a side of the respective LGPs, wherein each of the light emitting devices emits light toward the corresponding LGPs, and the light is reflected at the reflecting regions of the corresponding LGPs and emitted from the emitting regions of the corresponding LGPs,
wherein incident surfaces of the LGPs are aligned to each other, and each of the light emitting devices faces toward the incident surface of the corresponding LGP, such that the light emitted by the light emitting device is incident through the incident surface of the corresponding LGP.

2. The edge backlight module as claimed in claim 1, wherein each of the LGPs is divided into at least one lateral region extending in a direction perpendicular to the longitudinal region, the at least one longitudinal region and the at least one lateral region intersect with each other to form an array, each of the light emitting devices corresponds to at least one of the lateral region, and each of the light emitting devices comprises at least one white light emitter and at least one high saturation light emitter.

3. The edge backlight module as claimed in claim 1, wherein the number of the LGPs is M, the LGPs are stacked to form I layers at a side and J layers at another side, a lowermost LGP of the LGPs has M longitudinal regions and N lateral regions to form sub-regions of an M×N array, and I, J, M, and N are positive integers and satisfy I+J−1=M.

4. The edge backlight module as claimed in claim 1, wherein the LGPs comprise K longitudinal LGPs and L lateral LGPs, the K longitudinal LGPs are stacked to form O layers at a side and P layers at another side, the L lateral LGPs are stacked to form Q layers at a side and R layers at another side, the L lateral LGPs are located between the O layers and the P layers of the K longitudinal LGPs, and K, L, O, P, Q, and R are positive inters greater than 1 and satisfy O+P=K and Q+R−1=L.

5. The edge backlight module as claimed in claim 1, wherein the at least one reflecting film comprises at least one double-sided reflecting film, each of the double-sided reflecting film is completely overlapped with the reflecting region of the adjacent LGP located at lower position thereof, the edge backlight module further comprises at least one single-sided reflecting film disposed at a bottom of a low-ermost LGP of the LGPs, and a reflective coating film is disposed at a side of each of the LGPs opposite to the corresponding light emitting device.

6. The edge backlight module as claimed in claim 1, further comprising:
a light guide structure, disposed at an accommodating space formed by the LGPs in the stacked manner.

7. A display apparatus, comprising:
the edge backlight module as claimed in claim 1; and
a liquid crystal display panel, disposed above the edge backlight module.

8. A backlight control method, adapted to a display apparatus, comprising:
providing the edge backlight module as claimed in claim 1, wherein the LGPs are divided into sub-regions as an M×N array, wherein M and N are positive integers greater than 1, and each of the light emitting devices comprises at least one white light emitter and at least one high saturation light emitter;
dividing a frame to be displayed by the display apparatus into sub-frames as the M×N array, wherein the sub-frames respectively correspond to the sub-regions; and
respectively controlling to turn on and off the white light emitter and the high saturation light emitter corresponding to each of the sub-regions based on contents of the sub-frames.

9. The backlight control method as claimed in claim 8, wherein respectively controlling to turn on and off the white light emitter and the high saturation light emitter corresponding to each of the sub-regions based on the contents of the sub-frames comprises:
controlling to turn on the high saturation light emitter of the corresponding sub-region based on color saturation of one of the sub-frames; and
controlling to turn on the high saturation light emitter and the white light emitter of the corresponding sub-region together based on brightness of one of the sub-frames.

* * * * *